United States Patent
Geiselberger et al.

(10) Patent No.: US 9,802,636 B2
(45) Date of Patent: Oct. 31, 2017

(54) DEVICE FOR GUIDING A BODY AND STEERING COLUMN FOR A MOTOR VEHICLE

(71) Applicant: THYSSENKRUPP PRESTA AG, Eschen (LI)

(72) Inventors: Thomas Geiselberger, Rorschach (CH); Michael Hahn, Au (CH); Martin Fleischer, Balgach (CH)

(73) Assignee: THYSSENKRUPP PRESTA AG, Eschen (LI)

( * ) Notice: Subject to any disclaimer, the term of this patent is extended or adjusted under 35 U.S.C. 154(b) by 4 days.

(21) Appl. No.: 14/651,051

(22) PCT Filed: Sep. 18, 2013

(86) PCT No.: PCT/EP2013/002813
§ 371 (c)(1),
(2) Date: Aug. 12, 2015

(87) PCT Pub. No.: WO2014/090348
PCT Pub. Date: Jun. 19, 2014

(65) Prior Publication Data
US 2015/0353121 A1 Dec. 10, 2015

(30) Foreign Application Priority Data

Dec. 10, 2012 (DE) .......... 10 2012 024 037

(51) Int. Cl.
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC ................ B62D 1/184; B62D 1/185
See application file for complete search history.

(56) References Cited

U.S. PATENT DOCUMENTS

| 9,033,368 B2 * | 5/2015 | Ku .......... B62D 1/187 280/775 |
| 2004/0104565 A1 | 6/2004 | Tsuji et al. |
| 2011/0210538 A1 | 9/2011 | Warashina et al. |

FOREIGN PATENT DOCUMENTS

| CN | 1164210 A | 11/1997 |
| CN | 102167072 A | 8/2011 |
| DE | 102006028832 A1 * | 12/2007 ............. B62D 1/184 |
| EP | 0849141 A1 | 6/1998 |
| EP | 1870309 A2 | 12/2007 |
| GB | 2295219 A | 5/1996 |

(Continued)

OTHER PUBLICATIONS

Translation of EP1870309 listed on 1449 dated Jun. 10, 2015 (also a translation of DE102006028832).*

(Continued)

*Primary Examiner* — Faye M Fleming
(74) *Attorney, Agent, or Firm* — RMCK Law Group, PLC

(57) ABSTRACT

The invention relates to an apparatus for guiding a body, comprising two guide walls which have inwardly directed surfaces with in each case a sliding area, wherein, in the event of loading perpendicular to the sliding areas, the loaded guide wall is elastically deformed outward away from the guided body in the region of the sliding area and therefore the risk of damage to the guide at the sliding areas is minimized.

12 Claims, 5 Drawing Sheets

(56) References Cited

FOREIGN PATENT DOCUMENTS

Figure 1:
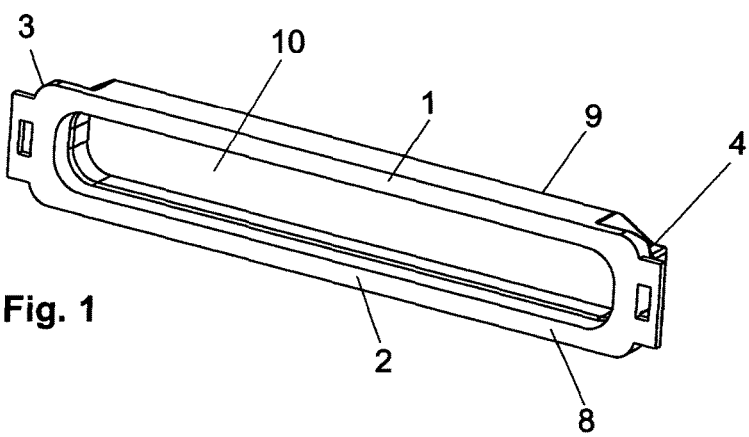

JP  S62139779 U  9/1987
WO  03018383 A1  3/2003

OTHER PUBLICATIONS

PCT International Search Report mailed Jan. 16, 2014 for PCT International Application No. PCT/EP2013/002813 with English Translation, 5 pages.
Chinese Office Action for Chinese Application No. 201380072606.X dated Jun. 27, 2016, 6 pages.

* cited by examiner

A-A

C-C

D-D

DEVICE FOR GUIDING A BODY AND STEERING COLUMN FOR A MOTOR VEHICLE

CROSS-REFERENCE TO RELATED APPLICATIONS

This application is a 371 U.S. National Stage of International Application No. PCT/EP2013/002813, filed Sep. 18, 2013, which claims priority to German Application No. DE102012024037.6 filed on Dec. 10, 2012. The disclosure of each of the above applications is incorporated herein by reference in their entirety.

FIELD

The present disclosure relates to an apparatus for guiding a body and steering column for a motor vehicle.

BACKGROUND

It is known, particularly from the field of adjustable steering columns of motor vehicles, to provide plastic sliding guides with a bolt which passes transversely through the guide. In the case of adjustable steering columns, the guide box, comprising casing pipe with steering spindle, is connected to a bracket on the crossmember in the vehicle by a sliding guide. In this case, the steering column can be moved to a secured position by an interlocking locking system. In order to compensate for the weight of the steering wheel which is fitted to the end of the steering spindle, a spring is provided in order to offset the weight, for example a metal spring on each of the two sides of the sliding guide.

When the steering column locking system is incorrectly opened without the steering wheel or a substitute mass being present, the guide box springs upward owing to the spring force of the spring. The longitudinal guide of the adjustable steering column is damaged in the process. Further damage can be caused by opening the locking system if the driver is resting on the steering wheel during opening.

As a consequence, owing to the damage to the guide, the displacement force for moving the steering wheel varies and a deterioration in mobility is noticeable.

End-side stop damping arrangements for a pin in a sliding guide are known from EP 1 870 309 A1 and EP 1 420 994 B1. Both documents describe embodiments in which the damping means are fitted to the end regions of the guide element. This leads to the end stop being damped in the guide direction. In contrast, loads which are produced transverse to the guide direction cannot be damped in this case.

SUMMARY

The object of the invention is to specify an apparatus for guiding a body, in which apparatus damage to the longitudinal guide owing to improper operator control or opening and closing is largely prevented.

An apparatus for guiding a body according to the present disclosure comprises a first guide wall and a second guide wall which is arranged parallel to and at a distance from the first guide wall. The first guide wall and the second guide wall are connected to one another by means of a first head piece at one end and preferably also by means of a second head piece at another end in such a way that the guide walls and the head pieces delimit a guide opening. The guide opening is bordered by a substantially planar front end on one side and by a rear end on the other side. The guide walls have surfaces which face one another, surround the circumference of the guide opening and are directed inward with respect to the guide opening, having at least one lug with a material thickness which supports a latching hook, wherein the latching hook is at a distance measured from the lug, and therefore the distance of the latching hook from the front end corresponds to the sum of the distance and the material thickness which is designed to secure the apparatus to a supporting part by holding a wall of the supporting part. The inwardly directed surfaces of the guide walls each have a sliding area, wherein the distance of the sliding areas from one another determines the clear width of the guide opening, and whereas a distance of the sliding areas from the front end is at least 75% of the abovementioned distance from the front end. In other words, the distance forms the fitting depth with which the guiding apparatus can be inserted into a supporting part by way of its latching hooks.

The substantially planar front end could in this case be planar in the technical sense, or else have longitudinally grooves or longitudinal webs which are oriented parallel to the guide opening, wherein the raised webs lie in one plane.

An apparatus for guiding a body comprising a first guide wall and a second guide wall which is arranged parallel to and at a distance from the first guide wall is provided. The first guide wall and the second guide wall are connected to one another by means of a first head piece at one end and by means of a second head piece at another end in such a way that the guide walls and the head pieces delimit a guide opening. The guide opening is bordered by a substantially planar front end on one side and by a rear end on the other side. The guide walls have surfaces which face one another, surround the circumference of the guide opening and are directed inward with respect to the guide opening, having at least one lug with a material thickness which supports a latching hook, wherein there is a distance between the lug and an undercut in the latching hook, and therefore the distance of the undercut in the latching hook from the front end corresponds to the sum of the distance and the material thickness which is designed to secure the apparatus to a supporting part in a latching manner by holding a wall of the supporting part. The inwardly directed surfaces of the guide walls each have a sliding area, wherein the distance of the sliding areas from one another determines the clear width of the guide opening, and in which a distance of the sliding areas from the front end is at least 75% of the distance of the undercut in the latching hook from the front end.

In an advantageous refinement, the sliding areas are at a constant distance from one another over their longitudinal extent, and therefore a body which is guided between them is positively guided along the guide direction with constant friction. Since the body is preferably pressed against the sliding areas by the opposite sliding areas with only a low level of force, the friction between the body and the sliding areas is relatively low. The force with which the body is pressed between the sliding areas is to be designed to be as low as possible during construction, it being necessary for secure sliding guidance to be ensured.

In a preferred development, the apparatus has guide walls which are formed such that, in the event of loading perpendicular to the sliding areas, the loaded guide wall is elastically deformed outward away from the guided body in the region of the sliding area. As a result, the loadings can be captured by the claimed guide wall outside the sliding areas, and therefore the damage to the guide can be avoided for the most part.

In a generally advantageous refinement, the width of the guide opening at the front end of the apparatus is greater than the width at the rear end, wherein the width of the rear end of the apparatus is selected such that the surfaces of the guide walls, which surfaces are directed inward from the rear end, form the sliding areas, and wherein a transition region is provided between the width at the front end and the width in the region of the sliding areas.

It is further preferred for the surfaces of the guide walls, which surfaces are directed inward from the rear end of the apparatus, to have a recess in the transition region.

It is further advantageous for the transition region to be oriented parallel to the front end.

In general, the apparatus preferably comprises latching hooks which are designed to clip the apparatus into the supporting part.

The distance from the recess as far as the front end of the apparatus further preferably at least has a depth which corresponds to 75% of the distance defined above which preferably corresponds to the distance between the undercut in the latching hook from the front end.

In a preferred second exemplary embodiment, the apparatus has, in the transition region, a bevel which extends as far as the front end of the apparatus or of which the depth corresponds at least to 75% of the distance defined above which preferably corresponds to the distance of the undercut in the latching hook from the front end. In the event of loading perpendicular to the sliding areas of a guide wall, the applied force can therefore be absorbed by the bevel, a relatively large area, and therefore the damage to the guide can be avoided for the most part.

Furthermore, the apparatus according to the invention can be part of a steering column of a motor vehicle.

Wherein the apparatus, in one embodiment, is held in a housing which rotatably mounts an upper part of a steering shaft, and wherein a clamping axle passes through the apparatus, and therefore the upper part of the steering shaft can be moved with respect to a lower part of the steering shaft by means of telescopic engagement, and therefore the steering column overall can be adjusted in respect of its length.

Further advantages and features of the invention can be gathered from the exemplary embodiments described below and also from the dependent claims.

DETAILED DESCRIPTION OF THE FIGURES

Figure 2:
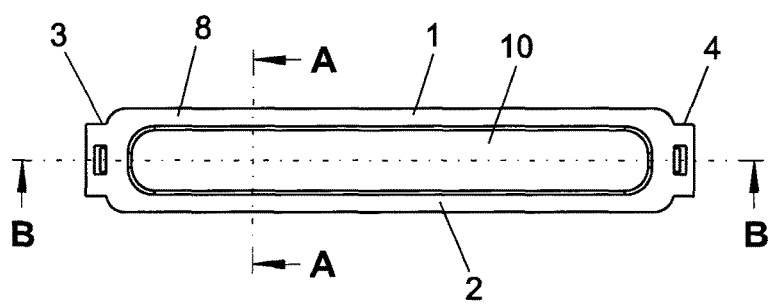
Figure 4B:
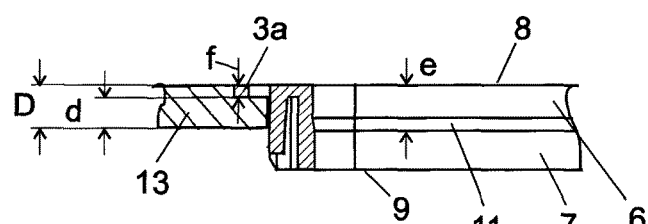
Figure 3:
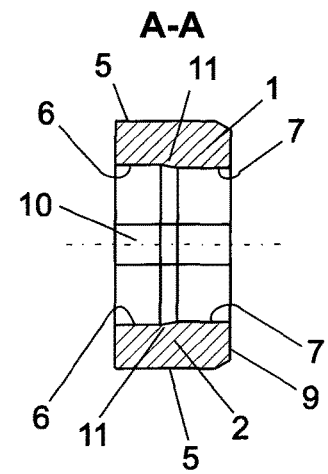
Figure 4A:
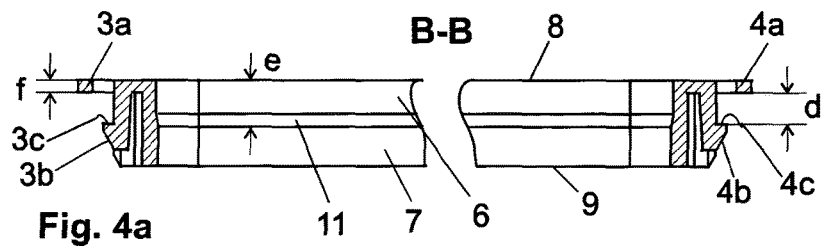
Figure 5:
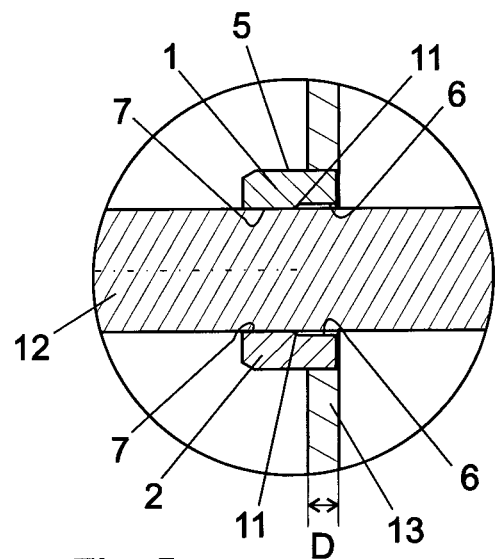
Figure 6:
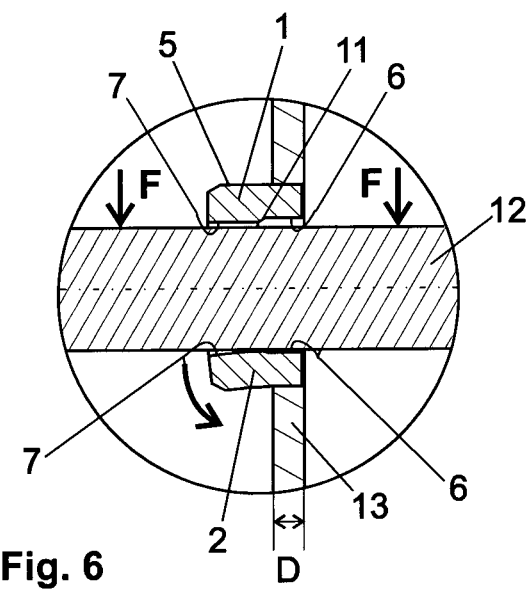
Figure 7:
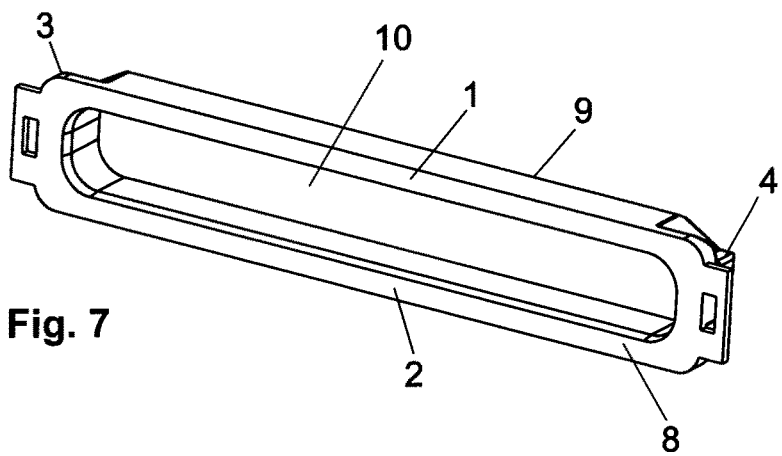
Figure 8:
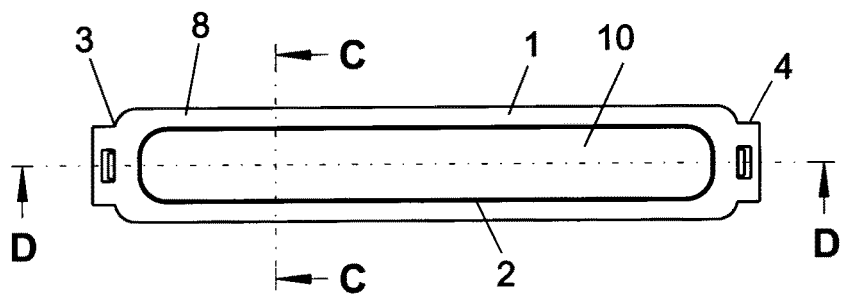
Figure 9:
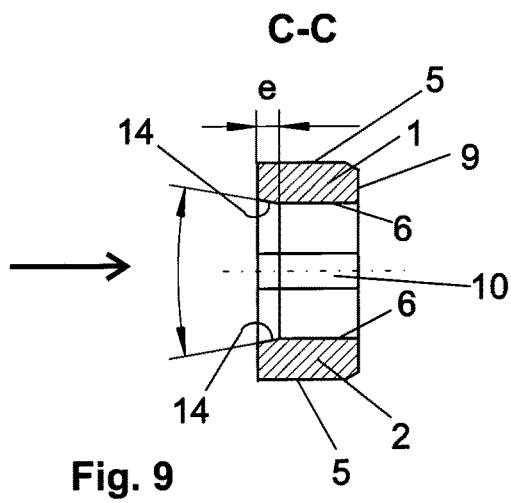
Figure 10:
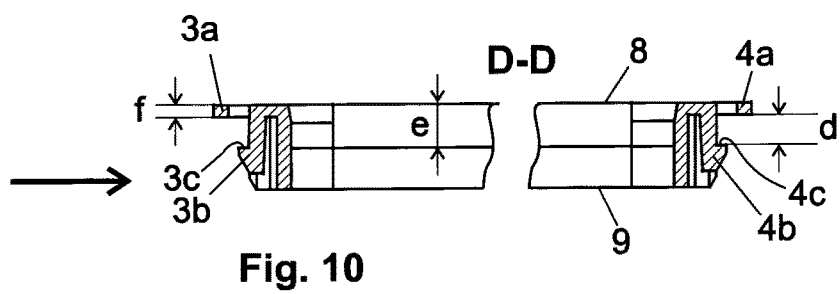
Figure 11:
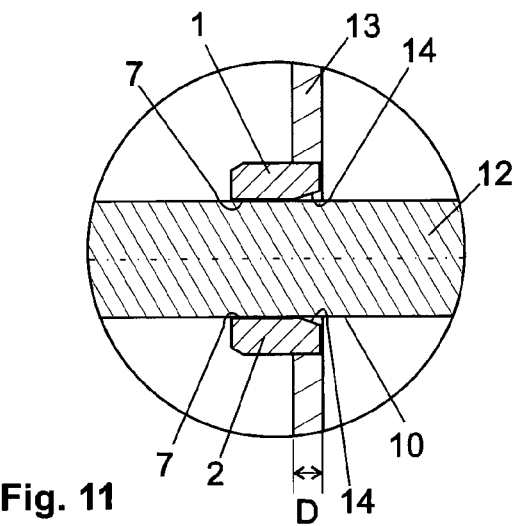
Figure 12:
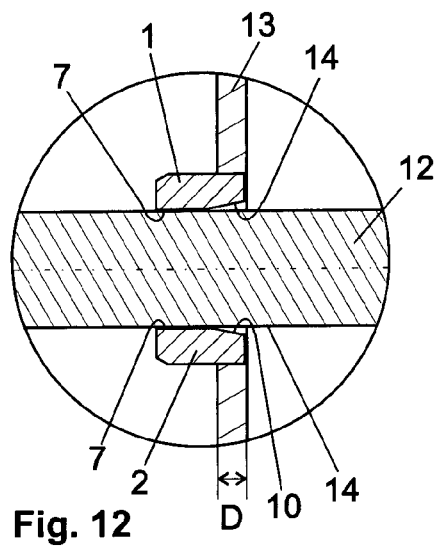
Figure 13:
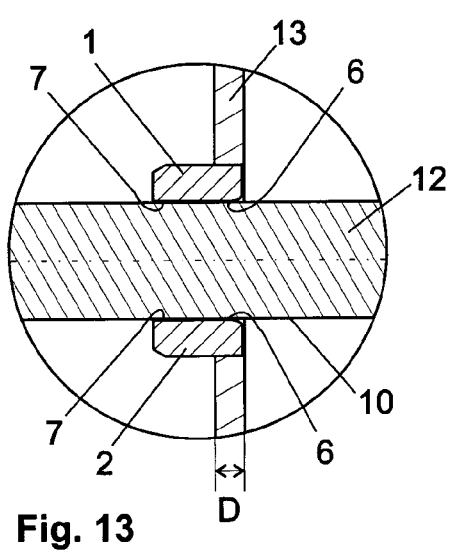
Figure 14:
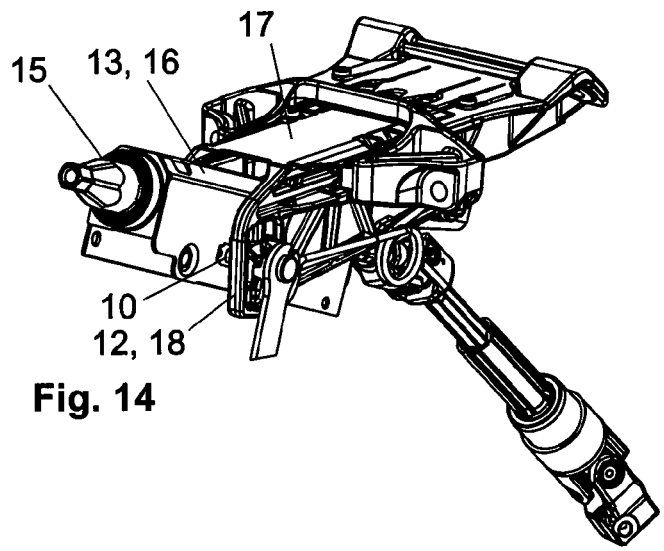
Figure 15:
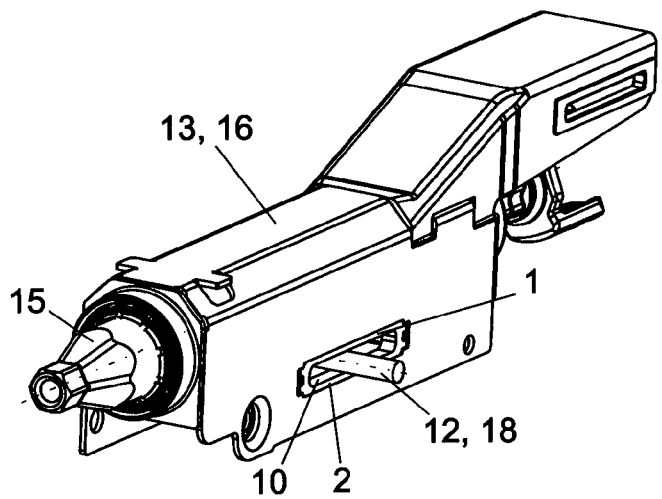
Figure 16:
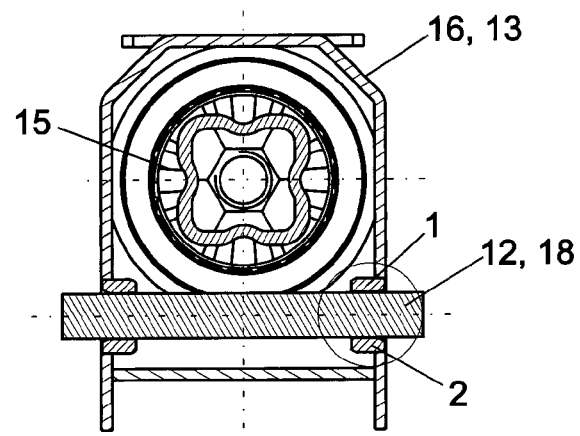

Two preferred exemplary embodiments of a steering column with an apparatus according to the invention provided on said steering column are described and explained in greater detail with reference to the appended drawings in the text which follows, in which:

FIG. 1 shows a three-dimensional view of an apparatus according to the invention, FIG. 2 shows a plan view of the apparatus from FIG. 1 from above, FIG. 3 shows a cross section through the apparatus from FIG. 2 along line A-A, FIG. 4*a* shows a longitudinal section through the apparatus from FIG. 2 along line B-B, FIG. 4*b* shows a longitudinal section through an apparatus according to FIG. 2 along line B-B, but in the other embodiment, FIG. 5 shows the view from FIG. 3 with a guided body, FIG. 6 shows the view from FIG. 3 with a guided body on which a force is exerted from above, FIG. 7 shows a three-dimensional view of a further embodiment of the invention, FIG. 8 shows a plan view of the apparatus from FIG. 7 from above, FIG. 9 shows a cross section through the apparatus from FIG. 7 along line C-C, FIG. 10 shows a longitudinal section through the apparatus from FIG. 7 along line D-D, FIG. 11 shows the view from FIG. 9 with a guided body, FIG. 12 shows the view from FIG. 9 with a guided body in another exemplary embodiment, FIG. 13 shows the view from FIG. 12 with the prior art, FIG. 14 is a schematic illustration of an adjustable steering column, FIG. 15 is a schematic illustration of a housing comprising an apparatus, and FIG. 16 shows a cross section through a housing comprising an apparatus.

All of the drawings are true-to-size, and therefore dimensional ratios of the preferred embodiment can be gathered in particular from the planar views.

DETAILED DESCRIPTION

FIG. 1 shows an apparatus for guiding a body, which apparatus is in the form of an integral plastic injection-molded part. The apparatus has a first guide wall 1 and a second guide wall 2 which is arranged parallel to said first guide wall, wherein the guide walls 1, 2 are connected to one another at the ends in each case by means of a first head piece 3 and a second head piece 4. The guide walls 1, 2 each have an outwardly directed surface 5 and an inwardly directed surface 6, wherein the inwardly directed surfaces 6 of the guide walls each form a sliding area 7 on which the body is guided in the apparatus. The guide walls 1, 2 and the head pieces 3, 4 form a front end 8 which lies in a common plane. A rear end 9, not visible in FIG. 1, is situated opposite the front end 8. An elongate guide opening 10 is formed in the front end 8 between the guide walls 1, 2 and the head pieces 3, 4.

FIG. 2 shows the front end 8 of the apparatus.

FIG. 3 shows the cross section through the apparatus along line A-A from FIG. 2. The inwardly directed surfaces 6 of the guide walls 1 and 2 have, starting from the rear end 9 of the apparatus, a recess 11 which extends over a distance e from the front end 8 of the apparatus. In this case, the clear width of the guide opening 10 corresponds, with a small amount of play, to the diameter of the guided body. The width of the guide opening 10 at the front end 8 of the apparatus is widened with respect to the width at the rear end 9. The region of the inwardly directed surfaces 6, which region extends from the rear end 9 of the apparatus as far as the recess 11, forms the sliding areas 7 on which the body is guided in the apparatus.

The longitudinal section through the apparatus along line B-B from FIG. 2 is shown in FIG. 4*a*. The head pieces 3, 4 each have a lug 3*a*, 4*a* which is oriented parallel to the plane of the front end 8 and has a material thickness f and a latching hook 3*b*, 4*b* which is approximately perpendicular to the plane of the guide opening 10 and which allows the apparatus to be clipped into a supporting part, not illustrated here. In addition, cutouts are in each case provided in the lugs 3*a*, 4*a*. These cutouts serve to simplify removal of the apparatus. That side of the lugs 3*a*, 4*a* which faces the latching hook 3*b*, 4*b* is at a distance d from an undercut 3*c*, 4*c* in the latching hook 3*b*, 4*b*. The sum of the distance d and the material thickness f of the lug 3*a*, 4*a* corresponds exactly to a material thickness D of the supporting part into which the apparatus is clipped with the aid of the latching hooks 3*b*, 4b. In principle, it is feasible and possible to form the guiding apparatus without latching hooks having undercuts, as is illustrated in FIG. 4b. A length, the distance d, is provided on the latching hook which does not have to latch in at all, it being possible for said latching hook to be inserted into a supporting part by way of said length. In order to illustrate the distance d, a piece of the supporting part 13 is further illustrated in FIG. 4b. The distance d can then be considered to be the fitting depth with which the apparatus is inserted into the supporting part 13 which is shown in the further illustrations. However, latching hooks with undercuts, as are illustrated in FIG. 4a, are preferred for secure fitting.

The position of the recess 11 in the guide walls 1, 2 is defined by means of the sum of the distance d and the material thickness f of the lug 3a, 4a. In this case, the region of the distance e, in which the distance between the inwardly directed surfaces 6 is greater than that of the diameter of the guided body, extends at least over the distance of the sum of the distance d and the material thickness f of the lug 3a, 4a. The inwardly directed surface 6 from the recess 11 as far as the front end 8 of the apparatus is arranged in a manner offset in parallel in relation to the sliding area 7. In this case, the width of the guide opening 10 at the front end 8 of the apparatus is to be selected such that the guide walls 1, 2 have a residual thickness which guarantees the stability of the component and does not have a disadvantageous influence on the manufacturing process.

FIG. 5 shows how the guided body 12 passes completely through the guide opening 10 between the guide walls 1, 2. The guided body 12 extends perpendicular to the guide opening 10 which is delimited by the guide walls 1, 2. In this case, the apparatus is connected to a supporting part 13 which has the material thickness D.

FIG. 6 shows, from above, the situation in the event of the production of a brief loading transverse to the apparatus. The lower guide wall 2 in the region of the sliding area 7 deforms elastically downward and the force of the loading is absorbed by the edge of the recess 11. After the loading ends, the guide wall 2 returns to its starting position again.

The produced forces at the edge can lead to plastic deformation of the component at this point. However, in this case, the sliding area 7 remains undamaged, and therefore the guided body 12 can be guided within the guide opening 10 without restrictions.

A second embodiment of the invention is shown in FIG. 7 to FIG. 12, wherein identical components are provided with the same reference numerals.

In this case, an apparatus for guiding a body, which is in the form of an integral plastic injection-molded part, is likewise illustrated in FIG. 7. The apparatus has a first guide wall 1 and a second guide wall 2 which is arranged parallel to said first guide wall, wherein the guide walls 1, 2 are connected to one another at the ends in each case by means of a first head piece 3 and a second head piece 4. The guide walls 1, 2 each have an outwardly directed surface 5 and an inwardly directed surface 6, wherein the inwardly directed surfaces 6 of the guide walls each form a sliding area 7 on which the body is guided in the apparatus. The guide walls 1, 2 and the head pieces 3, 4 form a front end 8 which lies in a common plane. A rear end 9, not visible in FIG. 7, is situated opposite the front end 8. An elongate guide opening 10 is formed between the guide walls 1, 2 and the head pieces 3, 4.

FIG. 8 shows the front end 8 of the apparatus according to the second embodiment.

FIG. 9 shows the cross section through the apparatus according to the second embodiment along line C-C from FIG. 8. The inwardly directed surfaces 6 of the guide walls 1, 2 have, starting from the rear end 9 of the apparatus, a widening of the opening 10. In this case, the width of the guide opening 10 at the rear end 9 of the apparatus corresponds, with a small amount of play, to the diameter of the guided body, this region representing the sliding areas 7 on which the body is guided in the apparatus. The width of the guide opening 10 at the front end 8 of the apparatus is widened with respect to the width at the rear end 9.

The opening 10 is widened by a bevel 14 which adjoins the sliding areas 7 which are situated in the direction of the rear end 9 of the apparatus and has a distance e from the sliding area 7 as far as the front end 8 of the apparatus.

The longitudinal section through the apparatus along line D-D from FIG. 8 is shown in FIG. 10. The head pieces 3, 4 each have a lug 3a, 4a which is oriented parallel to the plane of the front end 8 and has a material thickness f and a latching hook 3b, 4b which is approximately perpendicular to the plane of the guide opening 10 and which allows the apparatus to be clipped into a supporting part, not illustrated here. In addition, cutouts are in each case provided in the lugs 3a, 4a. These cutouts serve to simplify removal of the apparatus. That side of the lugs which faces the latching hook 3b, 4b is at a distance d from the undercut 3c, 4c in the latching hook 3b, 4b in this embodiment too. The sum of the distance d and the material thickness f of the lug 3a, 4a likewise corresponds exactly to the material thickness D of the supporting part into which the apparatus is clipped with the aid of the latching hooks 3b, 4b.

The dimension of the bevel 14 of the guide walls 1, 2 is defined by means of the sum of the distance d and the material thickness f of the lug 3a, 4a. In this case, the region of the bevel extends over the distance e, in which region the distance between the inwardly directed surfaces 6 is greater than that of the diameter of the guided body and which at least has a length of the sum of the distance d and the material thickness f of the lug 3a, 4a. In this case, the angle of the bevel 14 is variable. However, the guide walls 1, 2 should have a residual thickness in the direction of the front end 8, this residual thickness guaranteeing the stability of the component and not having a disadvantageous influence on the production process.

FIGS. 11 and 12 show how the guided body 12 passes completely through the guide opening 10 between the guide walls 1, 2. The guided body 12 extends perpendicular to the guide opening 10 which is delimited by the guide walls 1, 2. In this case, the apparatus is connected to a supporting part 13 which has the material thickness D. Furthermore, two different bevels 14 with different angles are shown in this second embodiment.

The bevel 14 on those surfaces 6 of the guide walls 1, 2 which are directed inward, in contrast to the first embodiment with a recess 11, has the effect of absorbing the force of a larger area in the event of loading and therefore further minimizing risk of damage to the guide on the sliding areas 7.

In comparison, FIG. 13 shows the prior art. The inwardly directed surfaces 6 of the guide walls 1, 2 can each be described by a plane parallel to the axis of the guided body 12. The guide is damaged in the event of loading transverse to the apparatus. This results in it being possible for the force which is required to displace the guided body 12 to be locally varied, this causing a noticeable deterioration in the movement.

FIG. 14 shows a three-dimensional view of a steering column of a motor vehicle, which steering column comprises the apparatus. An upper part of a steering shaft 15 is rotatably mounted on a housing 16. The upper part of the steering shaft 15 can be moved in the direction of the steering shaft relative to a lower part 17 of the steering shaft by means of telescopic engagement, and therefore the steering column overall can be adjusted in respect of its length.

To this end, the housing 16 has an opening for holding an apparatus for guiding a body, see FIG. 15. The housing 16 therefore corresponds to the supporting part 13 and is in the form of a metal sheet. A clamping axle 18 passes through the guide opening 10 in the apparatus and the housing 16. The clamping axle 18 corresponds to the above-described guided body 12.

The cross section in FIG. 16 through the housing 16 shows the arrangement of the clamping axle 18, the guide walls 1, 2 and the housing 16 in relation to one another. The apparatus with the guide walls 1, 2 is fitted in the opening 10 in the housing which rotatably mounts the upper part of the steering shaft 15. The clamping axle 18 passes through the housing 16 through the guide opening 10.

The clamping axle 18 can be clamped in its axial direction by means of a fixing lever, as a result of which said clamping axle can be fixed within the guide opening 10 by means of the support plate being braced against the housing 16 and/or the apparatus in its selectable position. As a result, the set length of the steering column is fixed at the same time. In the released position of the lever, the steering shaft 15 with the housing 16 can be displaced in relation to the clamping axle 18 which is fixed with respect to the vehicle body.

In one example, end stops can additionally also be provided in the apparatus. These end stops, known from EP 1 870 309 A2, provide reliable end-side stop damping of the guided body in the guide opening 10 using simple means.

In another example, the guide device or apparatus for guiding a body can also be integrated on a holding part which is fixed to the vehicle and to which the adjustable steering column part can be fixed in a releasable manner.

In yet another example the apparatus can, as an alternative or in addition, be provided in a vertical adjustment system of the steering column. The steering column shown in FIG. 14 has a vertical adjustment system of this kind which, more precisely, is an adjustment system for an angle of inclination, to which end the steering shaft is connected to a support by means of a rotary joint, and additionally has a Cardan joint. Particularly in the case of vertical or inclination adjustment of the steering column of this kind, the guide walls 1, 2 can also substantially have a curved profile, and therefore the body 12 is guided, for example, on the portion of a circular path.

Overall, a plurality of the apparatuses or guide means for, in particular, a plurality of adjustment directions can also be provided on a steering column.

LIST OF REFERENCE SYMBOLS

1 First guide wall
2 Second guide wall
3 First head piece
4 Second head piece
3a, 4a Lugs
3b, 4b Latching hooks
3c, 4c Undercut in the latching hook
5 Outwardly directed surface of a guide wall
6 Inwardly directed surface of a guide wall
7 Sliding area
8 Front end of the apparatus
9 Rear end of the apparatus
10 Guide opening
11 Recess
12 Guided body
13 Supporting part
14 Bevel
15 Upper part of the steering shaft
16 Housing
17 Lower part of the steering shaft
18 Clamping axle
d Distance
e Distance
f Material thickness of the lug
D Material thickness of the supporting part

The invention claimed is:

1. An apparatus for guiding a body, comprising:
a first guide wall;
a second guide wall which is arranged parallel to and at a distance from the first guide wall, wherein the first guide wall and the second guide wall are connected to one another by means of a first head piece at one end in such a way that the guide walls and the first head piece delimit a guide opening, wherein the guide opening is bordered by a substantially planar front end on one side and by a rear end on another side thereof, and wherein the guide walls have surfaces which face one another, surround a circumference of the guide opening and are directed inward with respect to the guide opening;
at least one lug with a material thickness (f) which supports a latching hook, wherein the latching hook is at a distance (d) measured from the lug, and therefore the distance of the latching hook from the front end corresponds to a sum of the distance (d) and the material thickness (f) which is designed to secure the apparatus to a supporting part by holding a wall of the supporting part, wherein the inwardly directed surfaces of the guide walls each have a sliding area, wherein the distance of the sliding areas from one another determines the clear width of the guide opening, and in that a distance (e) of the sliding areas from the front end is at least 75% of the distance of the latching hook from the front end; and
wherein a first width of the guide opening at the front end of the apparatus is greater than a second width at the rear end, wherein the second width of the rear end of the apparatus is selected such that the surfaces of the guide walls, which surfaces are directed inward from the rear end, form the sliding areas, and wherein a transition region is provided between the first width at the front end and an intermediate width in a region of the sliding areas.

2. The apparatus of claim 1 wherein the sliding areas are at a constant distance from one another over their longitudinal extent, and therefore a body which is guided between them is positively guided along the guide direction with constant friction.

3. The apparatus of claim 1 wherein the guide walls are formed such that, in the event of loading perpendicular to the sliding areas, the loaded guide wall is elastically deformed outward away from the guided body in the region of the sliding area.

4. The apparatus of claim 1 wherein the surfaces of the guide walls, which surfaces are directed inward from the rear end of the apparatus, have a recess in the transition region.

5. The apparatus as claimed in claim 4 wherein the transition region is oriented parallel to the front end.

6. The apparatus of claim 1 wherein the latching hook is configured to clip the apparatus into the supporting part.

7. The apparatus of claim 1 wherein the distance (e) from the recess as far as the front end of the apparatus at least has a depth which corresponds to 75% of the distance of the latching hook from the front end.

8. The apparatus of claim 1 wherein the transition region has a bevel which extends as far as the front end of the apparatus.

9. The apparatus of claim 1 wherein the transition region has a depth that corresponds at least to 75% of the distance of the latching hook from the front end.

10. The apparatus of claim 1 wherein the apparatus is part of a steering column of a motor vehicle.

11. The apparatus of claim 1 wherein the apparatus is held in a housing which rotatably mounts an upper part of a steering shaft, wherein a clamping axle passes through the apparatus, and therefore the upper part of the steering shaft can be moved with respect to a lower part of the steering shaft by means of telescopic engagement, and therefore the steering column overall can be adjusted in respect of its length.

12. The apparatus of claim 1 wherein the distance (d) is defined by the distance between the lug and an undercut in the latching hook.

* * * * *